United States Patent [19]

Hung et al.

[11] Patent Number: 4,929,250
[45] Date of Patent: May 29, 1990

[54] ULTRAVIOLET ABSORBING LENSES AND METHOD OF MAKING THE SAME

[75] Inventors: William M. Hung; Kai C. Su, both of Alpharetta, Ga.

[73] Assignee: Ciba-Geigy Corporation, Ardsley, N.Y.

[21] Appl. No.: 323,354

[22] Filed: Mar. 14, 1989

[51] Int. Cl.$^5$ .................... D06P 5/00; C07D 251/00; C07D 253/00

[52] U.S. Cl. .......................................... 8/507; 8/549; 8/647; 8/648; 351/162; 544/180

[58] Field of Search ............................ 8/507, 549, 648

[56] References Cited

U.S. PATENT DOCUMENTS

| | | | |
|---|---|---|---|
| 3,476,499 | 11/1969 | Wichterle | 8/507 |
| 4,303,701 | 12/1981 | Torgersen et al. | 8/507 |
| 4,304,895 | 12/1981 | Loshaek | 526/313 |
| 4,390,676 | 6/1983 | Loshaek | 526/313 |
| 4,447,474 | 5/1984 | Neefe | 8/507 |
| 4,559,059 | 12/1985 | Su | 8/507 |
| 4,668,240 | 5/1987 | Loshaek | 8/507 |
| 4,702,574 | 10/1987 | Bawa | 8/507 |
| 4,719,248 | 1/1988 | Bambury et al. | 523/108 |
| 4,795,461 | 1/1989 | Lindqvist et al. | 623/6 |
| 4,845,180 | 7/1989 | Henry et al. | 528/73 |

FOREIGN PATENT DOCUMENTS 885986 1/1962 United Kingdom.

*Primary Examiner*—A. Lionel Clingman
*Attorney, Agent, or Firm*—Irving M. Fishman

[57] ABSTRACT

An ultraviolet radiation absorbing contact lens and method of making the same, comprising a copolymeric hydrogel material to which is covalently bonded at least one halotriazine reactive ultraviolet radiation absorbing agent of the formula:

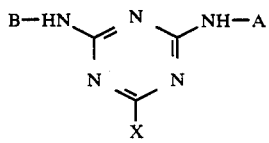

where
X = Cl or F;
A = an ultraviolet radiation absorbing component; and
B = an aqueous soluble moiety.

9 Claims, No Drawings

ULTRAVIOLET ABSORBING LENSES AND METHOD OF MAKING THE SAME

BACKGROUND OF THE INVENTION

The present invention relates to ultraviolet radiation absorbing contact lenses and to a method for their preparation. More particularly, the invention relates to hydrophilic or "soft" contact lenses having a reactive ultraviolet radiation absorbing agent covalently bonded to polymeric material.

Ultraviolet radiation is ever present in our environment, and consists of wave lengths between 200-400 nm. Exposure to ultraviolet radiation has been found to be the cause of several ocular pathologies. The damaging effect of ultraviolet radiation on the corneal epithelium has been known for a long time. For instance, studies have demonstrated the damaging effect of 290 nm radiation on the rabbit corneal epithelium (Cullen, A. P. (1980): *Ultraviolet Induced Lysosome Activity in Corneal Epithelium,* Graefes Arch Clin Exp. Ophthalmol 214:107-118), as well as changes in the stroma and endothelium of primary corneal layers (epithelium, stroma and endothelium) subsequent to exposure to a commercially available UV suntan lamp which emits radiation across the full spectrum from 280 nm (Ringvold, A., et al. (1985): *Changes in the Rabbit Corneal Stroma Caused by UV-Radiation.* Acta Ophthalmol. (Copenh) 63:601-606). Compounding the damage is the fact that ultraviolet radiation damage to the eye is known to be cumulative and obeys the law of reciprocity. These findings reinforce the importance of adequate ocular protection against ultraviolet radiation. Such protection is particularly recommended for people who are prone to UV exposure, patients who have had cataract surgery and patients on photo-sensitizing drugs.

Recently, contact lenses have been developed which serve to absorb ultraviolet radiation. For example, U.S. Pat. No. 4,390,676 discloses an ultraviolet absorbing contact lens formed by copolymerizing a monomer suitable for making lenses and an ultraviolet absorber for absorbing radiation having wavelengths of 340 to 450 nm. The UV absorbing compound, 2-hydroxy-4-methacryloxy-benzophenone or mixtures thereof, is incorporated into the lens' polymeric material at the molecular level. Also, U.S. Pat. No. 4,528,311 discloses ultraviolet light absorbing contact lenses made of a polymeric composition comprising copolymers of 2-hydroxy-5-acrylyloxyphenyl-2H-benzotriazole with one or more other monomers copolymerizable therewith.

The above compounds have been found to copolymerize and give protection to the material. However, the copolymerization efficiency of the compounds has proved to be inadequate. Typically, no more than 15% of the alkenyloxy-benzophenones actually become part of the polymeric chain. The remainder of the material is easily leached out by solvent extraction. Furthermore, while the hydroxy benzophenones copolymerizable with acrylate monomers are effective UV absorbers and form chemically stable copolymers, relatively large amounts, i.e. 3 to 10% by weight, must be incorporated in the polymer to obtain 85% UV absorption at 400 nm and 1 mm thickness. Also, the compounds exhibit very broad absorption bands which extend into the visible spectrum, and lenses incorporating these ingredients tend to be unacceptably yellow in color.

There exists a need, therefore, for an improved ultraviolet radiation absorbing contact lens.

There exists a more particular need for a lens which incorporates a relatively small amount of absorbing agent, which exhibits relatively little yellowing, and from which the absorbing agent does not leach out.

SUMMARY OF THE INVENTION

The present invention relates to ultraviolet radiation absorbing lenses, and a method for their production, comprising a UV absorbing agent covalently bonded to a polymeric lens material. The lens exhibits very little yellowing, and can be produced using a relatively small amount of the absorbing agent. Also, because of the covalent bonding, the absorbing agent does not leach from the lens.

The absorbing agent has the formula:

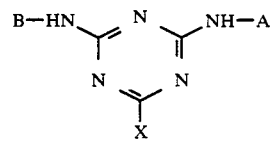

where
X = Cl or F;
A = an ultraviolet radiation absorbing component; and
B = an aqueous soluble moiety.

The ultraviolet radiation absorbing component is preferably selected from the group consisting of:

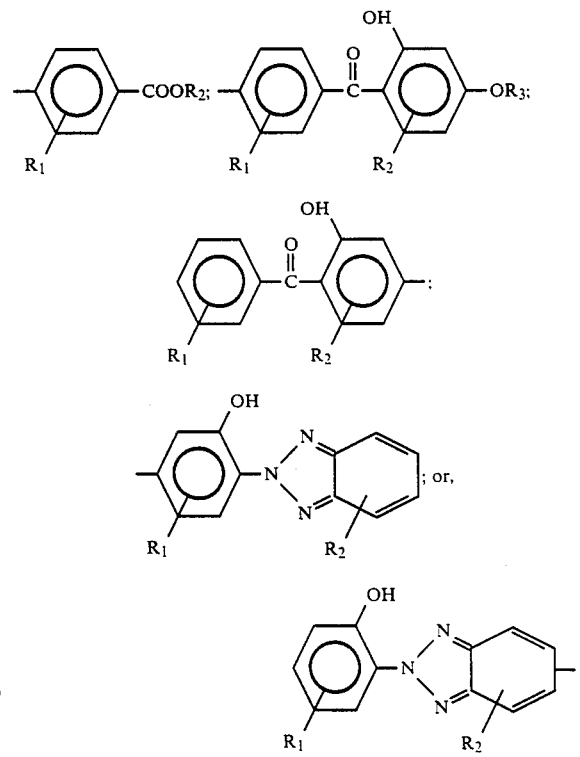

where $R_1$–$R_3$ are selected from the group consisting of H, alkyl chains varying from $C_1$ to $C_{18}$, alkoxy, halogen, nitro, hydroxy, carboxy, sulfonic acid, and sulfonic acid salt substituents. It is also preferred that the aqueous soluble moiety have the formula:

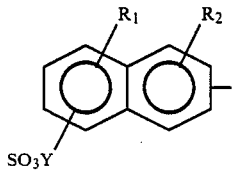

where Y is an amine salt or an alkali salt; and $R_1$–$R_2$ are selected from the group consisting of hydrogen, alkyl chains varying from $C_1$ to $C_{18}$, alkoxy, halogen, nitro, hydroxy, carboxy, sulfonic acid, or sulfonic acid salt substituents.

An ammonium quaternary salt may be used as a catalyst in the process of bonding the absorbing agent to the lens material.

DETAILED DESCRIPTION OF THE INVENTION

While the present invention is applicable to intraocular lenses and lenses used in spectacles, it will be described in connection with contact lenses.

The present invention relates to polymeric lens materials in which exoskeletal covalent bonds are formed between the monomer units of the polymer backbone and a reactive ultraviolet absorbing agent.

The composition of the polymeric lens material may vary so long as there is present in the monomer mixture a component which will provide the polymer with the required exoskeletal functional groups. Examples of such functional groups include hydroxyl, amino, amide and mercapto groups. Suitable monomers include hydroxyalkyl esters of polymerizable unsaturated acids, such as acrylic, methacrylic, fumaric and maleic acids. In addition to hydroxyalkyl esters of unsaturated acids, the following monomeric materials may serve as typical examples of co-monomers which can be used in conjunction with monomers providing the required functional groups: acrylic and methacrylic acids; alkyl and cycloalkyl acrylates and methacrylates; N-(1, 1-dimethyl-3-oxobutyl) acrylamide and heterocyclic N-vinyl compounds containing a carbonyl functionality adjacent to the nitrogen in the ring, such as N-vinyl pyrrolidone. A cross-linking agent, such as ethylene glycol dimethacrylate or diethylene glycol bis-allyl carbonate, may be used to provide the polymeric material. A preferred lens material is hydroxyethyl methacrylate (HEMA), as disclosed in U.S. Pat. No. 2,976,576 and U.S. Pat. Re. No. 27,401. An example of a "hard" contact lens material having an acceptable functional group is cellulose acetate butyrate.

The present invention employs a reactive ultraviolet absorbing agent of the following formula:

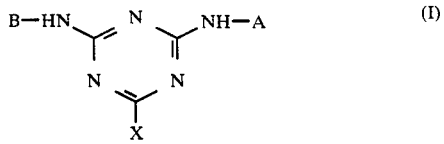

(I)

where
X = Cl or F;
A = an ultraviolet radiation absorbing component; and
B = an aqueous soluble moiety.

The ultraviolet radiation absorbing component (A) is preferably selected from the group including:

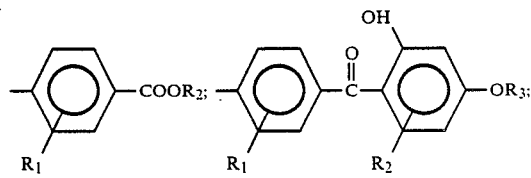

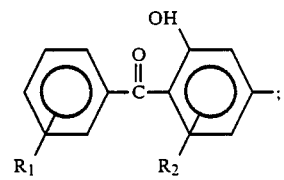

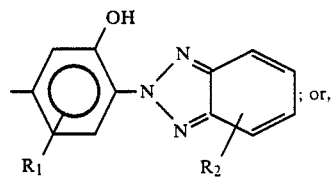

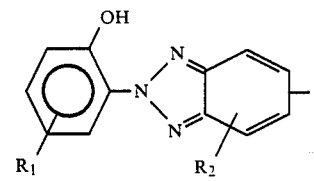

where $R_1$–$R_3$ are selected from the group consisting of H, alkyl chains varying from $C_1$ to $C_{18}$, alkoxy, halogen, nitro, hydroxy, carboxy, sulfonic acid, and sulfonic acid salt substituents.

It is also preferred that the aqueous soluble moiety have the formula:

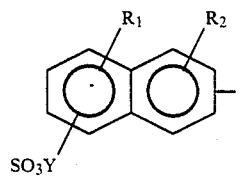

where Y is an amine salt or an alkali salt; and $R_1$–$R_2$ are selected from the group consisting of hydrogen, alkyl chains varying from $C_1$ to $C_{18}$, alkoxy, halogen, nitro, hydroxy, carboxy, sulfonic acid, or sulfonic acid salt substituents.

The ultraviolet radiation absorbing components represented by $NH_2A$ which are required to obtain the mono-halo-s-triazine of Formula I belong to known classes of compounds and readily obtained by conventional procedure well known in the art, such as the ones described in U.S. Pat. Nos. 3,159,646 and 3,041,330.

The following examples illustrate the production of ultraviolet absorbing agents according to the present invention:

EXAMPLE I

Cyanuric chloride, 18.4 g, was dissolved in 150 ml of warm acetone and the solution was poured into a stirred mixture of 200 g of ice and 200 ml of water. To this cyanuric chloride suspension was added simultaneously an aqueous solution made by dissolving 15.3 g of 4-amino salicyclic acid in 120 ml of water containing 5.4 g of sodium carbonate and a dilute sodium carbonate solution (5.4 g in 50 ml of $H_2O$). After addition, the mixture was stirred at 5°–10° C. for one and a half hour. The final pH of the mixture was 6.0. The solid was collected by filtration, washed with water and air dried to obtain 30.6 g of 2,4-dichloro-6-[(3-hydroxy-4-carboxy)phenylamino]-s-triazine.

EXAMPLE II

To a mixture of 150 ml of acetone, 100 ml of water, 1 g of sodium carbonate and 6.5 g of dichloro-s-triazine, prepared as described in Example I above, was added an aqueous solution (100 ml) of 7-amino-1,3-naphthalene disulfonic acid, monopotassium salt (8.0 g) containing one gram of sodium carbonate. The resulting mixture was refluxed for two hours. Most of acetone was then distilled off until the pot temperature reached 80° C. The reaction mixture was cooled to about 10° C. The solid which formed was collected by filtration and dried to obtain 1.55 g of 2-chloro-4-[7-(1,3-disulfo)naphthylamino]-6-[(3-hydroxy-4-carboxy)phenylamino]-s-triazine and its sodium salts. More product (9.3 g) was obtained by adjusting the filtrate to pH=3.0 and collecting the precipitate.

EXAMPLE III

Proceeding in a manner similar to that described in Example II above, 9.0 g of 2,4-dichloro-6-[(3-hydroxy-4-carboxy)phenylamino]-s-triazine, 10.5 g of 3-amino-2,7-naphthalene disulfonic acid, monosodium salt, trihydrate and 3.0 g of sodium carbonate were interacted in water-acetone mixture to obtain 11.04 g of 2-chloro-4-[3-(2,7-disulfo)naphthylamino]-6-[(3-hydroxy-4-carboxy)phenylamino]-s-triazine and its sodium salts.

EXAMPLE IV

Following the procedure described in Example I above, 55.2 g of cyanuric chloride was interacted with 120 g of 7-amino-1,3-naphthalene disulfonic acid, monopotassium salt in water-acetone mixture to obtain 81.6 g of 2,4-dichloro-6-[7-(1,3-disulfo)naphthylamino]-s-triazine.

EXAMPLE V

Proceeding in a manner similar to that described in Example II above, 4.9 g of 2,4-dichloro-6-[7-(1,3-disulfo)naphthylamino]-s-triazine, 2.26 g of 2-(4-amino-2-hydroxyphenyl)benzotriazole and 2.1 g of sodium carbonate were interacted in water-acetone mixture to obtain 2-chloro-4-[(3-hydroxy-4-benzotriazo-2-yl)phenylamino]-6-[7-(1,3disulfo)naphthylamino]-s-triazine and its sodium salts.

EXAMPLE VI

Proceeding in a manner similar to that described in Example II above, 47.4 g of 4-amino-2-hydroxy-4-methoxybenzophenone, 25.5 g of 2,4-dichloro-6-[7-(1,3-disulfo)naphthylamino]-s-triazine, and 10.5 g of sodium carbonate were interacted in water-acetone mixture to obtain 71.2 g of 2-chloro-4-[4-(2-hydroxy-4-methoxybenzoyl)phenylamino]-6-[7-(1,3-disulfo)naphthylamino]-s-triazine and its sodium salts.

The standard process for incorporating the reactive ultraviolet absorbing agent into the lens involves contacting the agent to the lens material, preferably under mild reaction conditions. In one method, for example, the lens is rinsed with deionized water and placed in a dry vial. Two milliliters each of a solution containing a reactive UV absorbing agent and diluted sodium carbonate solution are then added to the vial. The vial containing the solutions and the lens is placed in a vial rack in a shaker bath at a set temperature and speed. After a set predetermined period of time has elapsed, the lens is removed from the vial, rinsed with deionized water, and extracted with a 10% glycerine (aq) solution at 80° C. for two hours. The lens is then rinsed with water and stored in a 0.9% saline solution for 30 minutes. The transmission and/or absorbance spectrum of the lens can then be determined using a UV spectrophotometer.

It has also been found that the bonding of the ultraviolet absorbing agent and lens material may be enhanced by including an ammonium quaternary salt catalyst in the agent incorporating process. Examples of such ammonium quaternary salts include triethylbenzylammonium chloride, tetrabutylammonium hydrogen sulfate, phenyltrimethylammonium chloride, benzyltributylammonium chloride, tetrabutylammonium bromide, and tetramethylammonium chloride.

The following Example VII will illustrate the effect of different catalysts on the incorporation of reactive UV absorbing agents in contact lenses:

EXAMPLE VII

A series of corneal contact lenses was prepared and UV transmittance spectra were taken as set forth in the above-described standard process, except that 0.1 ml of an aqueous solution holding a catalyst was added to the vial containing the lens, a tri-sodium phosphate solution for maintaining a high pH and the aqueous solution having a UV blocking agent. The temperature of the bath was maintained at 45° C., the shaker bath speed was at 100 strokes per minute and the time the lenses remained in the shaker bath was two hours. A 1% aqueous solution of the compound of Example VI was employed as the reactive UV blocking agent solution.

Transmittance data from UV absorbing lenses prepared as above using various catalyst solutions were compared to transmittance data from lenses identically prepared except that no catalyst was employed. A sharp decrease in the transmittance curve for lenses prepared without a catalyst was found to occur around 360 nm, and transmittance spectra for these lenses exhibit a shoulder in the region from 275 to 360 nm with a small peak occurring around 290 nm. As is shown in Table I, the quaternary ammonium salt catalysts substantially improved the UV absorbing characteristics of the lenses.

TABLE I

| Catalyst | % T at 290 nm | Transmittance characteristics in the 275–360 nm range. |
|---|---|---|
| 1. no catalyst | 2.3% | shoulder |
| 2. 10% Tyloxapol (aq) | 6.9% | pronounced shoulder |
| 3. 10% Varsulf SBFA-30 (aq) | 4.6% | distinct shoulder |
| 4. 10% Pluronic F-127 (aq) | 2.3% | similar to no catalyst |
| 5. 5% triethylbenzylammonium chloride (aq) | <1% | no shoulder |
| 6. 5% cetylpyridinium chloride (ag) | 9.2% | very prominent shoulder |
| 7. 5% tetrabutylammonium | <1% | no shoulder |

TABLE I-continued

| Catalyst | % T at 290 nm | Transmittance characteristics in the 275-360 nm range. |
|---|---|---|
| hydrogen sulfate (aq) | | |
| 8. 5% p-dimethylamino-pyridine | 2.3% | similar to no catalyst |

The following Example VIII further illustrates the effectiveness of different quaternary ammonium salts on the incorporation of absorbing agents in contact lenses:

EXAMPLE VIII

A series of corneal contact lenses was prepared and UV transmittance and absorbance spectra were taken as set forth in Example VII, except that 0.2 ml of a 5% aqueous solution of a quaternary ammonium salt was added to the vial containing the lens, the tri-sodium phosphate solution, and the solution containing a UV blocking agent. The temperature of the bath was maintained at 45° C., the shaker bath speed was 110 strokes per minute, and the time the lenses remained in the shaker bath was two hours. A 1% aqueous solution of the compound of Example VI was employed as the reactive UV blocking agent solution. Five percent (5%) aqueous solutions of (1) tetrabutylammonium hydrogen sulfate, (2) phenyltrimethyammonium chloride, (3) benzyltributylammonium chloride, (4) tetrabutylammonium bromide, (5) tetramethylammonium chloride and (6) a polyquat solution were tested in this example.

Transmittance data from UV absorbing lenses prepared utilizing (1), (2), (3), and (4) showed the superior UV absorbing characteristics of these lenses compared to lenses prepared without any catalyst. The transmittance peak at around 290 nm that appeared in a lens prepared without any catalyst and the shoulder in the 275 to 360 nm region was not present in lenses prepared in the presence of (1), (2), (3) or (4). Absorbance of UV radiation in the 290 nm to 400 nm region was greatest for lenses prepared using (3) followed by those prepared using (4), (1) and (2) respectively. The use of (5) as a catalyst produced lenses with UV absorbing characteristics only slightly better than lenses prepared in the absence of a catalyst. However, the use of (6) as a catalyst retarded the incorporation of the UV absorbing agent in the lens, and lenses prepared in the presence of (6) showed poor UV absorption in the 260 to 400 nm region.

What is claimed is:

1. A process for preparing an ultraviolet radiation absorbing contact or intraocular lens material, comprising the steps of preparing an aqueous solution of effective amounts of a halotriazine reactive ultraviolet radiation absorbing agent and a base, wherein said reactive ultraviolet radiation absorbing agent is of the formula:

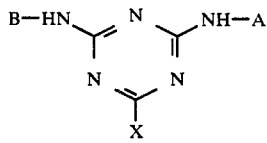

where
X=Cl or F;
A=an ultraviolet radiation absorbing component selected from the group consisting of

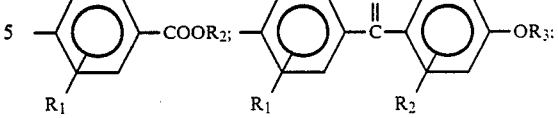

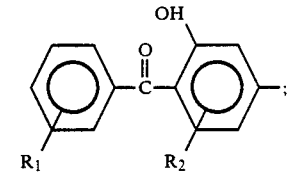

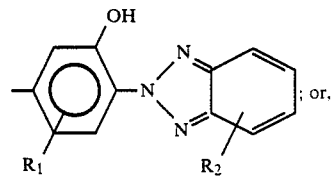

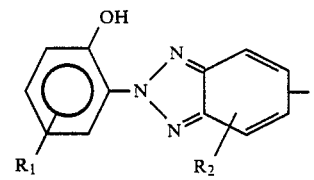

where
$R_1$–$R_3$ are selected from the group consisting of hydrogen, alkyl chains varying from $C_1$ to $C_{18}$, alkoxy, halogen, nitro, hydroxy, carboxy, sulfonic acid, or sulfonic acid salt substituents; and
B=an aqueous soluble moiety of the formula

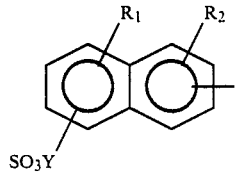

where
Y is an amine salt or an alkali salt; and
$R_1$–$R_2$ are selected from the group consisting of hydrogen, alkyl chains varying from $C_1$ to $C_{18}$, alkoxy, halogen, nitro, hydroxy, carboxy, sulfonic acid, or sulfonic acid salt substituents,
maintaining said solution for a preselected period of time at a temperature up to at least 30° C.; adding a polymeric contact or intraocular lens material to said solution; said polymeric lens material having an exoskeletal functional group selected from the group consisting of hydroxyl, amino, amide and mercapto groups and removing said polymeric lens material from the solution after a preselected time.

2. A process according to claim 1, and further comprising the step of adding an effective amount of an ammonium quaternary salt to said solution prior to said maintaining step.

3. A process according to claim 2, wherein said ammonium quaternary salt is selected from the group consisting of triethylbenzylammonium chloride, tetrabutylammonium hydrogen sulfate, phenyltrimethylammonium chloride, benzyltributylammonium chloride, tetrabutylammonium bromide, and tetramethylammonium chloride.

4. A process according to claim 1, and further comprising the step of shaping said polymeric material into a contact lens.

5. A process according to claim 1, wherein said solution has a pH of at least 10.

6. A process according to claim 1, wherein said absorbing agent is fluorotriazine reactive.

7. A process according to claim 1, wherein said absorbing agent is chlorotriazine reactive.

8. A process to claim 1, and further comprising the step of shaping said polymeric material into an intraocular lens.

9. An ultraviolet radiation absorbing contact or intraocular lens, comprising a polymeric contact or intraocular lens material said polymeric lens material having an exoskeletal functional group selected from the group consisting of hydroxyl, amino, amide and mercapto groups to which is covalently bonded at least one halotriazine reactive ultraviolet radiation absorbing agent of the formula:

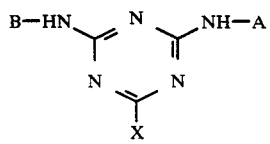

where
X=Cl or F;
A=an ultraviolet radiation absorbing component; and
B=an aqueous soluble moiety or mixtures thereof, wherein said ultraviolet radiation absorbing component is selected from the group consisting of:

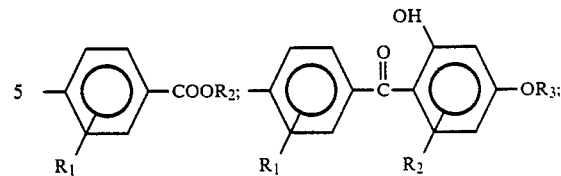

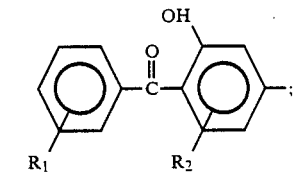

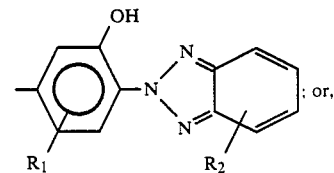

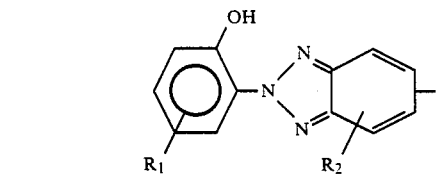

where
$R_1$-$R_3$ are selected from the group consisting of hydrogen, alkyl chains varying from $C_1$ to $C_{18}$, alkoxy, halogen, nitro, hydroxy, carboxy, sulfonic acid, or sulfonic acid salt substituents; and wherein said aqueous soluble moiety has the formula:

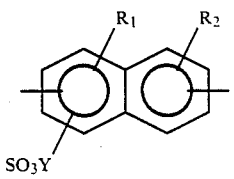

where:
Y is an amine salt or an alkali salt; and
$R_1$-$R_2$ are selected from the group consisting of H, alkyl chains varying from $C_1$ to $C_{18}$, alkoxy, halogen, nitro, hydroxy, carboxy, sulfonic acid, or sulfonic acid salt substituents.

* * * * *